July 29, 1941.  A. BOYNTON  2,250,462
MEASURING DEVICE FOR STEEL LINES
Filed Oct. 28, 1938   3 Sheets-Sheet 1
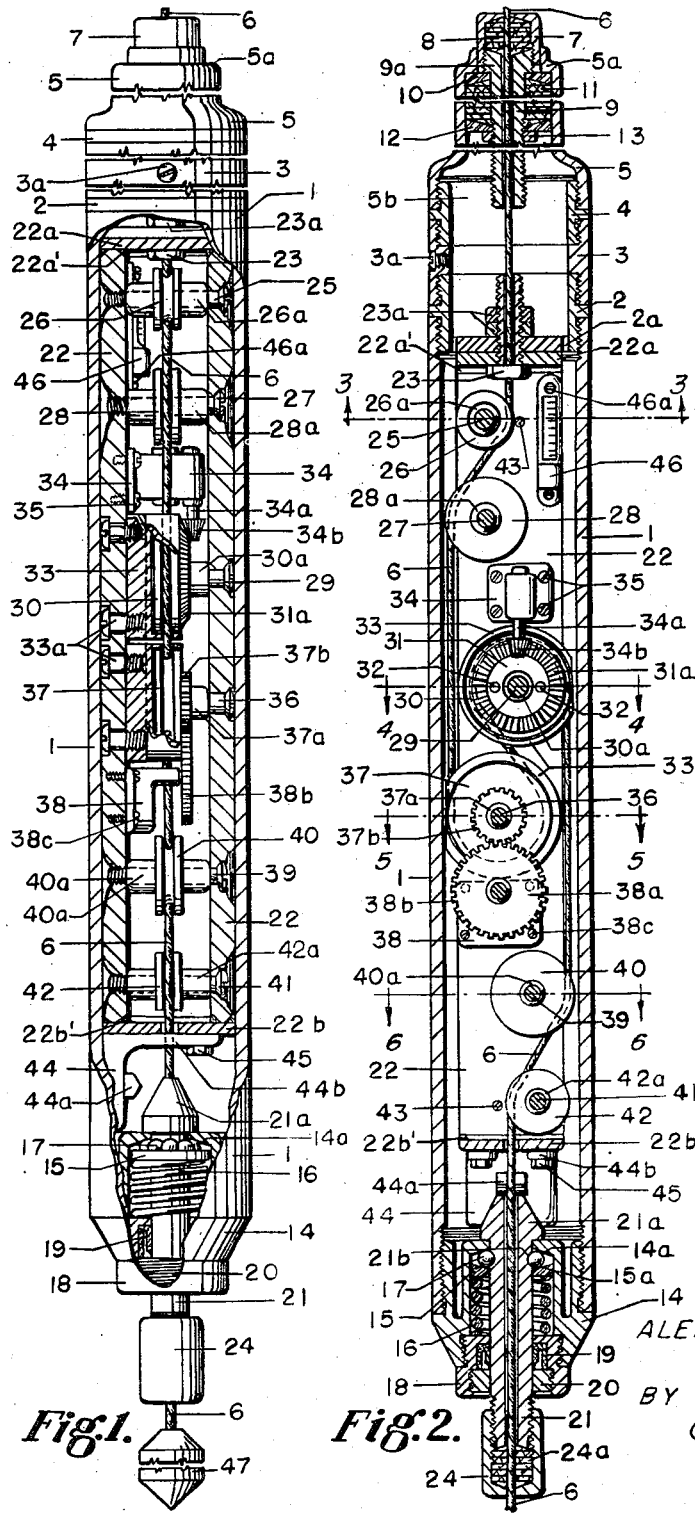
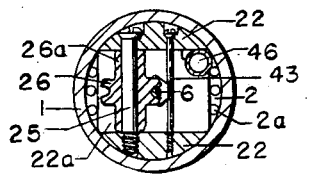
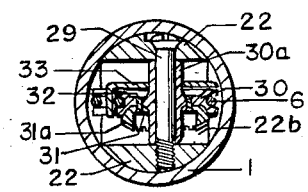
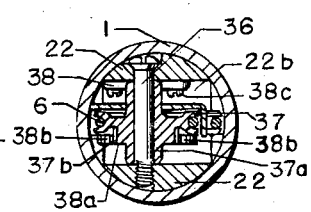
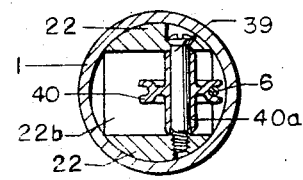
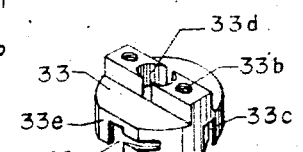
ALEXANDER BOYNTON,
INVENTOR,
BY Jesse R. Stone
Lester B. Clark
ATTORNEYS.

July 29, 1941.     A. BOYNTON     2,250,462
MEASURING DEVICE FOR STEEL LINES
Filed Oct. 28, 1938     3 Sheets-Sheet 2
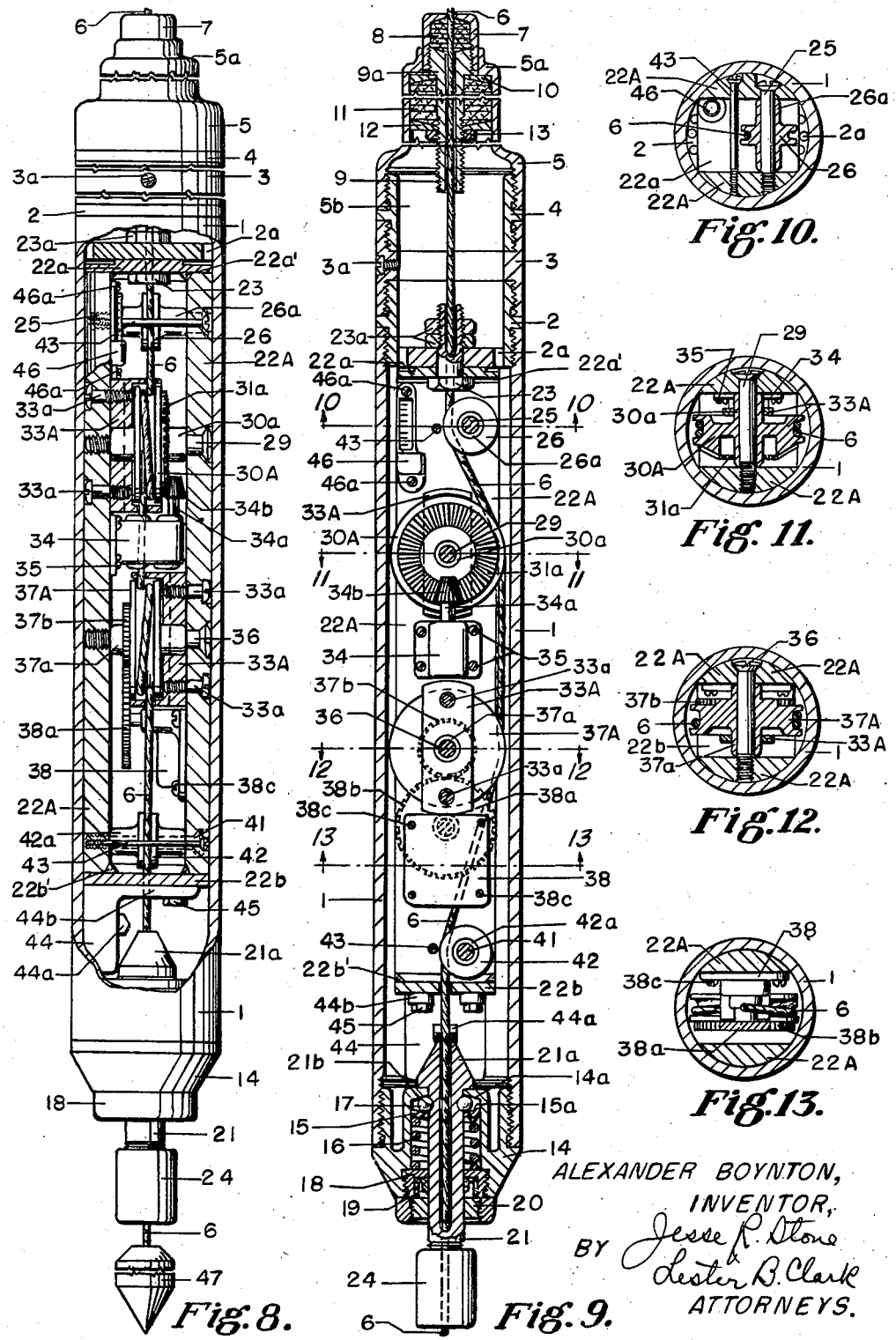
ALEXANDER BOYNTON,
INVENTOR,
BY Jesse R. Stone
Lester B. Clark
ATTORNEYS.

July 29, 1941.　　　　A. BOYNTON　　　　2,250,462
MEASURING DEVICE FOR STEEL LINES
Filed Oct. 28, 1938　　　3 Sheets-Sheet 3

ALEXANDER BOYNTON,
INVENTOR,
BY Jesse R. Stone
Lester B. Clark
ATTORNEYS.

Patented July 29, 1941

2,250,462

UNITED STATES PATENT OFFICE 2,250,462

MEASURING DEVICE FOR STEEL LINES

Alexander Boynton, San Antonio, Tex.

Application October 28, 1938, Serial No. 237,527

8 Claims. (Cl. 33—141)

REISSUED

AUG 25 1942

My invention relates to measuring and recording means for accurately determining the length of steel lines or cables.

The objects are to accurately measure (1) the depth of wells, particularly, deep drilled wells, (2) the depth to any given level therein, (3) the distance from one point to another anywhere that a line or cable can be extended to communicate in a straight line between such points whether such extension be accomplished by employing one or more lengths of the line or cable.

Further objects are (4) to measure a line or cable where it is and as it is after it has been subjected to all forces and conditions which operate to change its length, (5) to incorporate in the measuring means a braking mechanism that will regulate and control the speed at which the measuring and recording mechanism will travel downward upon the line or cable in a well, (6) to record temperature changes in the device which will afford definite and accurate means for calculating the factor of error due to changes of temperature during the measuring operation, and (7) to provide means for definitely determining whether or not the device had actually measured and recorded the depth to the desired level before its withdrawal from the well was begun.

The importance of accurate measurements in deep oil and gas wells is rapidly becoming more vital as progress is constantly made in the art of drilling to increasingly greater depths. This is true because wells are progressively more expensive to drill as the depth increases and the factor of error in measurements also progressively increases with the depth. Oil or gas is frequently found immediately above or below water bearing or dry formations that will take up the oil or gas, one or the other of such water bearing or dry formations being sometimes encountered both above and below the oil or gas.

In some cases only a few feet, or even inches, separate the profitable formations from others that will ruin the well if not cemented off and thus prevented from coming into the well with the oil or gas. It is, therefore, necessary in such cases to ascertain with great exactness where cement should be forced out into some formations to close them and where liners should be set or the casing perforated to admit the pay.

In the modern practice of gun perforating the casing set in cement, a water well or a dry hole may result from what would have been a profitable oil or gas well had the shots been fired a few feet, or even inches, higher or lower than where they were fired due to inaccurate measurements.

There is no way of accurately measuring to great depths in a well except to measure the line or cable, hereinafter referred to as the line, after it has been placed in the well and, of course, after the line has been subjected to all length changing forces and conditions operating in the well. Stretch, due to weight of the line and the bottom end weight and expansion resulting from heat, makes inaccurate the practice of measuring a line as it is inserted into the well. The line, which has its units of lengths stamped upon it, is still more inaccurate than the line which is measured at the top of the well as it is inserted, because all measuring lines take some permanent stretch each time they are run into the well.

There is no rule by which increased length of a line, due to weight and temperature changes, can be calculated because the weight and temperature are both unknown factors. This is true because the weight of the line will depend upon its length, the specific gravity, temperature, and depth of liquid in the well. The depth to well liquid often will not be known at beginning of the test, and, if known, will sometimes change during the test. The temperature and specific gravity of the fluid in the well will also change with each increasing foot of depth, and neither of these changes will necessarily vary according to the depth. Furthermore, temperature changes also change the rate at which a line will be stretched by a given weight.

With the line hanging in the well, there is, therefore, no rule or formula that can do more than vary the units of lengths, factory markings on the line, or the well top measurement of the line, both of which are known to be wrong, from one error to another which may be worse than the first—unless the line be actually measured in the well where is and as is. The present invention effects such measurement.

I accomplish the objects stated by means of mechanism released at the top of the well and allowed to travel downward over the line previously placed in the well, said mechanism consisting of a series of small sheaves or pulleys mounted within a tubular case filled with oil, the measuring line contacting each pulley; and by means of an automatic counter, a recording thermometer, an oil pump, and a stop watch, the counter and oil pump each being operated by a pulley driven by the line and the stop watch being stopped by impact upon the weight at bottom end of the line, as will more clearly appear from the accompanying drawings in which—

Fig. 1 is, in part, an outside view and partly a longitudinal section through the preferred embodiment with some of the inner parts in outside view.

Fig. 2 is mainly a longitudinal section of the device shown in Fig. 1 with some of the inner parts in outside view, taken 90° around from the showing in Fig. 1.

Fig. 3 is a cross section on the line 3—3, Fig. 2.
Fig. 4 is a cross section on the line 4—4, Fig. 2.
Fig. 5 is a cross section on the line 5—5, Fig. 2.
Fig. 6 is a cross section on the line 6—6, Fig. 2.
Fig. 7 is a perspective view of a line shield used as an element of the device of the invention.

Fig. 8 is, in part, an outside view and partly a longitudinal section through a modified form of the invention with some of the inner parts in outside view.

Fig. 9 is mainly a longitudinal section of the device shown in Fig. 8 with some of the inner parts in outside view, taken 90° around from the showing in Fig. 8.

Fig. 10 is a cross section on the line 10—10, Fig. 9.
Fig. 11 is a cross section on the line 11—11, Fig. 9.
Fig. 12 is a cross section on the line 12—12, Fig. 9.
Fig. 13 is a cross section on the line 13—13, Fig. 9.

Figures 14, 15:
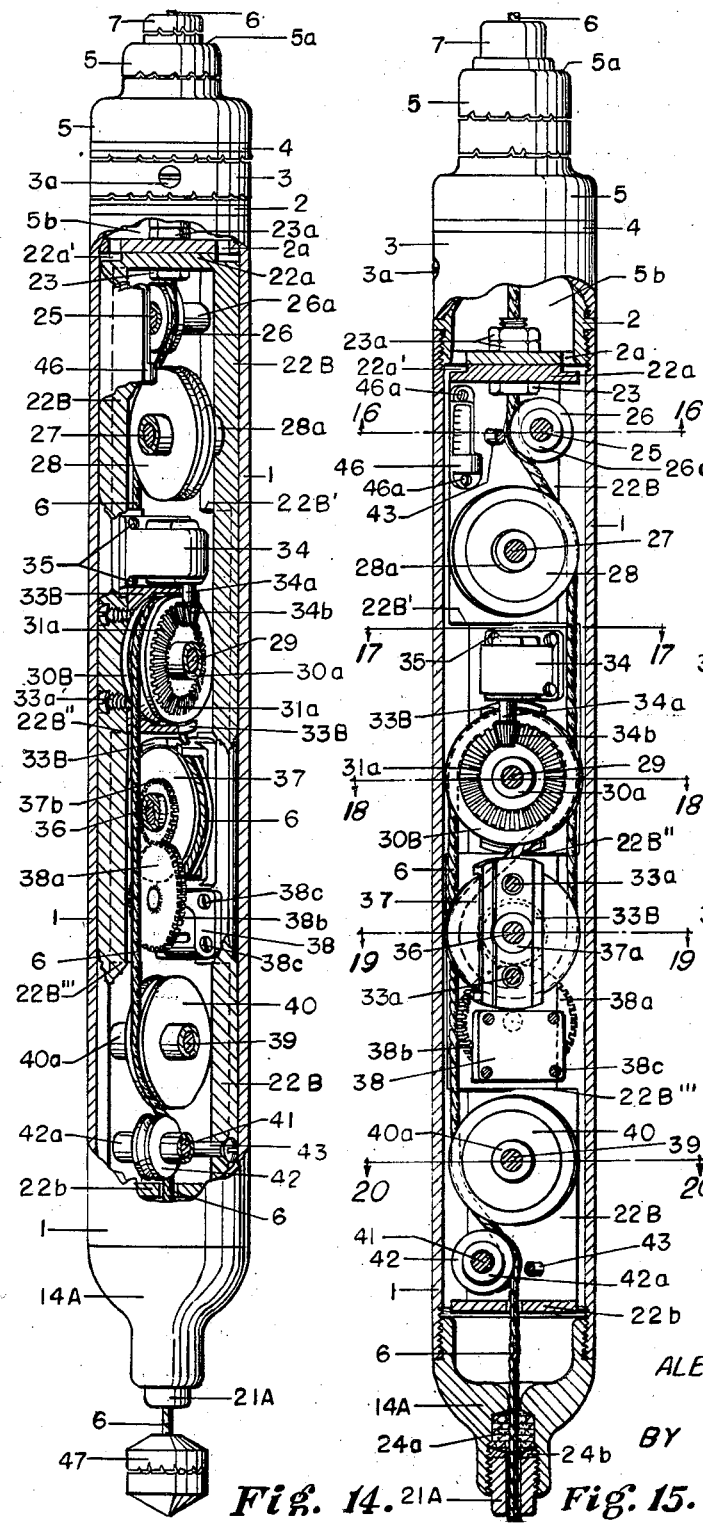

Fig. 14 is, in part, an outside view and partly a longitudinal section through another modified form of the invention with some of the inner parts in outside view.

Fig. 15 is mainly a longitudinal section of the device shown in Fig. 14 with some of the inner parts in outside view, taken 90° around from the showing in Fig. 14.

Figure 16:
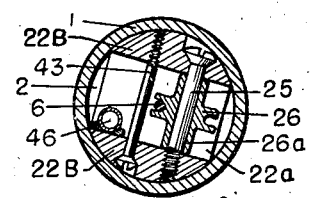
Figure 17:
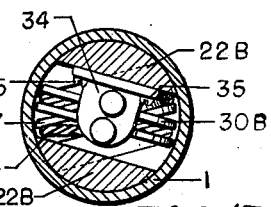
Figure 18:
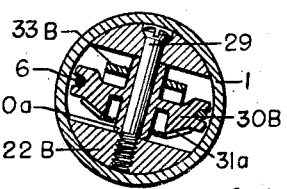
Figure 19:
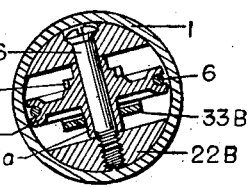
Figure 20:
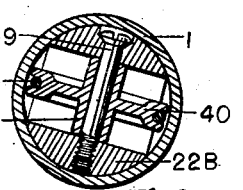

Fig. 16 is a cross section on the line 16—16, Fig. 15.
Fig. 17 is a cross section on the line 17—17, Fig. 15.
Fig. 18 is a cross section on the line 18—18, Fig. 15.
Fig. 19 is a cross section on the line 19—19, Fig. 15.
Fig. 20 is a cross section on the line 20—20, Fig. 15.

Similar characters of reference are employed to designate similar parts throughout the several views.

With particular reference to Figs. 1 to 7, inclusive, the tubular shell 1 is threadedly joined to anchor coupling 2 which is similarly joined to nipple 3. The internal coupling 4 is likewise joined to nipple 3 and to swaged nipple 5. The lower end of shell 1 has threaded connection with lower end plug 14, the bottom end of which has spring support ring 18 screwed into it.

The line 6, which, for example, may be a multi-strand steel cable 3/32" to 1/8" diameter, has free sliding clearance through the central opening in the upper end of packing nipple 7 and similar clearance through floating packing stem 9, anchor bolt 23, lower plate 22b, landing rod 21 and the central opening through the lower end of lower packing holder 24. The line 6 has a tight sliding clearance through packing 8, proximate the upper end of the assembly and through packing 24a, proximate the lower end of the assembly.

The sheaves 26, 28, 30, 37, 40, and 42, having lateral extensions 26a, 28a, 30a, 37a, 40a, and 42a, respectively, are rotatable upon their respective axle screws 25, 27, 29, 36, 39, and 41. Each of these screws pass through arms 22 and each is threadedly received within one of these arms, as appears in Fig. 1. The arms 22 are shown secured upon plates 22a and 22b by welds 22a' and 22b', respectively. The assembly of sheaves upon and between the arms 22 will be hereinafter referred to as the sheave assembly. This assembly secured upon coupling 2 by anchor bolt 23 and nuts 23a is slidably and removably received within shell 1.

Each of the sheaves has a peripheral groove within which the line 6 is received, as appears in Figs. 3, 4, 5, and 6. The sheave 26 holds the line central of shell 1 and the opening through bolt 23. The sheave 28 deflects the line to near the inner wall of shell 1 parallel to which surface the line then passes around the under side of sheave 37; thence upward to the left side of sheave 30, over this sheave and down to the right side of sheave 40; thence it passes over the left side of sheave 42. In Fig. 2 it will be observed that the sheave 30 is slightly off center to the right and that sheave 37 is slightly off center to the left. This is to provide that the line will have ample clearance where it doubles past itself on the left side of sheave 30 and on the right side of sheave 37; the off center position of the other sheaves being such as will cause them to position the line as stated and as shown in Figs. 1 and 2.

The pins 43, threaded into or otherwise secured through the arms 22, prevent the line from becoming accidentally disengaged from the peripheral grooves in sheaves 26 and 42. The sheaves 28 and 40 are in such close proximity to the inner surface of shell 1 that the line cannot become disengaged from the peripheral grooves in these sheaves. The line shield 33 has a central opening 33d, Fig. 7, adapted to loosely engage over the lateral extensions 30a and 37a of sheaves 30 and 37, respectively. The screws 33a, Fig. 1, secure these shields centrally over the extensions 30a and 37a, respectively, upon one of the arms 22 with the shell of the shield centrally positioned about each of these sheaves, the screws 33a having threaded engagement within the openings 33b, Fig. 7.

The clearance between each sheave and the shells is such that the sheave is freely rotatable therein, but that the line cannot become disengaged from the peripheral grooves of the sheave. The side cut 33e, Fig. 7, provides that the shield 33 may be positioned centrally over the sheave. The slots 33c are for assembling convenience, as well as to allow ingress and egress for the line. The shields 33 are interchangeable between sheaves 30 and 37, as will appear from an examination of Figs. 1 and 2.

The sheave 30 has gear teeth plate 31 secured upon one side of it by rivets 32 (see Fig. 4). The teeth 31a are adapted to enmesh with the teeth of pinion 34b, Figs. 1 and 2, the short shaft 34a being adapted to drive the oil pump 34 secured upon one of the arms 22 by screws 35. This oil pump, consisting of two enclosed gears, enmeshed between intake and discharge openings, and other pumps adapted to this use are available to the trade and, therefore, will not be further described.

Upon one side of the sheave 37 the gear teeth 37b are adapted to enmesh with teeth 38b of gear 38a to drive the counting device 38, which is secured upon one of the arms 22 by means of screws 38c. Numerous such counting devices are available upon the market, and, therefore, will not be further described.

The thermometer 46 which, preferably, should be of the recording type, may be secured upon one of the legs 22 by screws 46a.

The stop clock 44 may have its split plate 44b secured upon the under side of lower plate 22b by studs 45. The arm 44a is adapted to stop the clock when this arm is moved by the tapered head 21a in a manner that will be later explained.

The latch balls 17, Fig. 2, are impinged between the inclined annular ball roof 14a of member 14 and the ball floor 15, having a reciprocally inclined surface 15a, by the expansive force of coiled spring 16 with its upper end engaged under the ball floor 15 and its lower end supported upon ring 18. The latch balls 17 are resiliently urged into the annular groove 21b of rod 21 by the inclined surfaces 14a, 15a, and of spring 16, said groove having a depth somewhat less than one-half the diameter of the balls which, of course, are of uniform size. After the latch is sprung and rod 21, having clearance within the opening through the upper end of member 14, is forced upward to stop clock 44, as will be explained, the spring 16 will return the latch parts to the position shown in Fig. 2.

The packing 24a may be compressed by means of the threaded engagement between rod 21 and packing holder 24. The nipple 7 has a free sliding clearance through the central opening in flange 5a at the upper end of nipple 5. The upper expanded end 9a of rod 9 has threaded engagement within the lower end of nipple 7 and is thus adapted to compress packing 8. The floating packing 11 around the stem 9 is confined by roof plate 10, gland plate 12, slidable over stem 9, and the inner surface of nipple 5. This packing, which is closely slidable within the upper portion of nipple 5, may be compressed by gland nut 13 having threaded engagement over the stem 9, in order to keep the packing tight within said nipple. The parts 7, 8, 9, 10, 11, 12, and 13 constitute the movable packing assembly which, will be hereafter referred to as assembly 7—13.

The chamber 5 and shell 1 are kept filled with a lubricant admitted through the opening shown closed by plug 3a. The openings 2a allow the lubricant to pass out of chamber 5b and fill the shell, the clearance between rod 21 within the upper end of member 14 being such as will allow the lubricant to flow into the latch chamber containing balls 17 and spring 16. Therefore, the sheaves, latch, and all other moving parts will be constantly submerged in a lubricant.

The diameter of the grooved portion of sheave 37 may be made such as to have a circumference of exactly 6 inches. Then, if the driving gear teeth 37b are half as many in number as the driven teeth 38b, the counter will register in even feet and record the exact number of feet that the device has travelled over the line when stopped by weight 47. Manifestly, the counter should be of the reset type and adapted to register in only one direction, and, for convenience, should be set at zero before each measuring operation.

In operation within a well the device illustrated in Figs. 1 and 2 may be placed over the open upper end of the drill pipe or casing, usually proximate the ground surface or derrick floor, and held there while the line 6 is played off or allowed to run into the well, weight 47 serving to pull the line downward until the weight has reached the level to which measurement is desired. After this level has been reached by the weight, the line should be raised a distance at least equal to the stretch of the line that will be caused by the landing of member 24 upon weight 47 when the device reaches and is stopped by the weight. Careful measurement is made and a record kept of the distance that the line is raised after the weight lands at the level to which measurement is being taken. Unless the weight be so raised the stretch of the line as the device descends over it will cause slack line to accumulate above the weight and thus prevent proper landing of the device upon the weight before withdrawal from the well is begun.

When the device is released and allowed to travel downward over the line until the member 24 lands upon weight 47, the line causes each sheave to rotate upon its respective axle screw. The sheaves 26, 28, 40, and 42 serve only to deflect the line into the path shown in Figs. 1 and 2, as stated.

The sheaves 30 and 37, having more of their respective peripheries contacting the line than the other sheaves, are employed to transmit slight power from the line. The sheave 30, by means of gear teeth 31a, drives the pinion 34b which operates the oil circulating pump 34 for the purpose of developing a braking force to slow down and regulate the rate at which the device will fall. Manifestly, the faster the fall the faster the pump will be driven; thereby progressively developing greater resistance to the fall. The size of the discharge opening of the pump 34 may be varied in order to develop more or less oil pump resistance at all speeds thereof. While several other braking means have been devised for the device, the oil pump alone is shown, because, its simplicity and certainty of performance seem to render it most desirable for this purpose.

The sheave 37 operates the counter 38 through the enmeshed gear teeth 37b and 38b. The slight power necessary to operate this counter is so much less than the force which would be required to slip the line engaged upon the sheave that there is no danger of such slippage. The tautness of the line caused by the considerable weight of the device causes the line to engage each sheave with considerable force, particularly sheaves 30 and 37 which, respectively, drive the oil pump and counter.

Another reason why the line will not slip upon these sheaves is that the peripheral grooves of the sheaves, in which the line wraps, is, preferably, only very slightly, such as .002", wider than the line which, if a multi-strand cable, will become deformed enough to engage the sides of the groove and, thereby, act as a brake against any such slippage while the device is descending into the well.

While the weight 47 is being lowered into the well through the device held over the top of the well, as stated, the line may carry on its surface some oil out of the shell. Just before the device is released to measure the line, packing 8 and packing 24a should be checked and tightened, if necessary, and chamber 5b and shell 1 refilled through the opening shown closed by plug 3a, care being taken that the movable packing assembly 7—13 is then positioned at the top as shown in Fig. 2. The device, held at the top of the well until weight 47 lands and the weight 47 having been raised somewhat more than the stretch of the line that will be caused by the additional weight of the device when it lands upon weight 47, as stated, may then be released.

The counter 38 will register each revolution of sheave 37. The oil pump will control the rate of the fall. Packing 24a will wipe the line clean ahead of the device. Packing 8 strips the oil or other lubricant within the device off of the line but some of the lubricant may be carried through packing 8; thus tending to create a vacuum within chamber 5b. Such tendency to create a vacuum would invite the intrusion of well liquid into the device as it descends through this liquid.

U-cup 19, which may be of leather or any other suitable, tough, and durable substance, fitted into an annular recess within ring 18, engages around rod 21 and is held in place by ring 20, having threaded engagement within ring 18. This U-cup is adapted to be expanded and sealed off against rod 21 and member 18 by fluid seeking to enter the shell 1 through the clearance between ring 20 and rod 21; but to further minimize the danger of such intrusion, the packing assembly 7—13 is made slidable within the upper portion of nipple 5.

Whatever small volume of lubricant may be dragged out of the device through packing 8 by the line will be compensated for by the downward movement of the packing assembly 7—13 caused by the pressure of well liquid exterior of the device. This movable packing assembly, therefore, causes a constant approximate equality of pressure to be maintained within and exterior of the device; the only difference in these pressures being the negligible force required to slide the movable packing assembly 7—13 within nipple 5. The lower end of stem 9 will land upon the upper end of bolt 23 before the packing 11 will descend far enough to pass out of the upper portion of smaller diameter and into the lower expanded portion of nipple 5.

When the member 24 lands upon weight 47, the impact will spring the latch, forcing landing rod 21 upward, at which time the tapered head 21a will contact stop clock arm 44a of stop clock 44. The purpose of this clock is to afford positive information that the device, in its descent, actually reached weight 47 before withdrawal of the device from the well is begun. Manifestly, it would be possible for the device to become lodged upon some obstruction on its way down, and thus caused to measure only part of the desired distance. To avoid such a mistake, the operator checks his watch against the stop clock just before the device is placed in service. He notes also the time when withdrawal of the device from the well is begun. If this time is later than that registered by the stop clock when the device is withdrawn from the well, it is evident that the device landed upon the weight and, thus, measured all of the line before withdrawal was begun.

A sensitive weight indicator employed on the line above ground may be substituted for the stop clock in all forms of this invention. The indicated weight of the line and device after the device has begun its descent over the line, will hold quite constant until the device lands upon the weight 47, at which time the added weight of the device at rest will become apparent. There will be a quickly apparent lightening of the indicated weight when the device first enters well liquid and a gradual further lightening as the specific gravity of the well liquid increases with increased depth (unless the additional played off line should more than compensate for such lightening), but, since both of these changes indicate less weight, neither change will be confused with the sudden manifestation of increased weight when the device lands upon the weight 47.

The modification of the invention as illustrated in Figs. 14 and 15 specifically contemplates the use of a weight indicator and elimination of the stop clock and latch mechanism employed to stop the clock in the first two embodiments, as will appear in the description of this modification.

The thermometer 46 which, preferably, should be of the recording type, indicating the temperature changes and the time thereof, will afford accurate information by which diameter changes in the sheave 37 can be computed. An ordinary thermometer, however, may be employed if the recording type be not available. If, to illustrate, the temperature of the device and its contained lubricant be 68° when it is released for descent over the line, and it travels downward ten minutes, and ten minutes is required for the withdrawal, it is evident that one-half of the temperature change took place during the descent.

To further illustrate, if the starting temperature be 68° and the thermometer registers 80° when the device is withdrawn after 20 minutes (10 going in and 10 coming out), the temperature must have been 74° when the device lands upon the weight. The average temperature during the descent was, therefore, 71°. The increased diameter of sheave 37 at 71°, as compared with its diameter at 68°, affords exact data for correcting the indicated measurement. In this connection, it is apparent that the diameter of sheave 37 should be calipered at every temperature within the operating range before it is installed in the device and a record kept of such diameters to facilitate quick calculation on the job.

It being assumed that the circumference of the line groove in sheave 37 is six inches at 68° F., that this was the temperature of the device and its contained lubricant when it was released to travel over the line; that the counter records one for each two complete revolutions of the sheave; and that the counter was set at zero when the device was released; then, to ascertain the exact distance between the center of sheave 37 where the device was released and the top of weight 47, multiply or divide, as may be required, the counter reading by the coefficient of expansion indicated by the mean temperature during the descent of the device and add the distance that the weight was raised after it was landed and also add the length of weight 47 and the distance between the center of sheave 37 and the lower end of the device. To this sum add one and then subtract the distance that this sheave will turn to record another digit. The answer will be the exact distance between the center of sheave 37 at its starting point and the place where weight 47 was landed.

In order to read the thermometer, counter, and stop clock, and in order to ascertain the distance that the line will travel in the groove of sheave 37 before the counter will add another digit, the shell 1 may be removed. This is done by unscrewing the shell from anchor coupling 2 and then lowering the shell which uncovers the sheave assembly and all other parts attached to arms 22.

It will be noted that the line has already taken all of the stretch resulting from its own weight and weight 47 and temperature changes before the device is released to make and record the measurement. While it is true that the line will be stretched somewhat more by the partial weight of the device supported by the line during the descent of the device and further stretched when the device lands on weight 47, all this stretch occurs after the measurement has been made.

Attention is now directed to the modification illustrated in Figs. 8 to 13, both inclusive. It will be understood that the parts bearing reference characters corresponding to the similar parts in the preferred embodiment illustrated in Figs. 1 to 7, inclusive, are the same in construction and purpose and for the construction and use of such parts, reference is here made to the preceding specification. It will be further understood that portions of the device shown in outside view contain similar parts to those shown at the same place in the preceding form.

It will be noted in Figs. 8 and 9 that the line 6 passes completely around sheaves 30A and 37A, the wrap of the line around each of said sheaves being in the form of a helix. It will also be observed that the second sheave from the top and the second sheave from the bottom in Figs. 1 and 2 are omitted from Figs. 7 and 8. Otherwise, there is no appreciable difference in construction, except that line shields 33A do not cover as much of the geared sheaves as the shields 33 do in Figs. 1 and 2 and that the teeth 31a are integral with the sheave 30A in Figs. 8 and 9, wherein the plate 31 and rivets 32 are omitted from the construction employed in Figs. 1 and 2.

In reading the foregoing specification, as applicable to this modified form, it will be noted that sheaves 30A and 37A answer the same purpose as sheaves 30 and 37 in the first form, the peripheral grooves for wire 6, however, being wide enough for two wraps in Figs. 8 and 9 instead of only wide enough for one wrap as in Figs. 1 and 2. The arms 22A in Figs. 8 and 9 are, in all respects, the same as the arms 22 in Figs. 1 and 2, except that two sheaves 28 and 41 and their axle screws, appearing in Figs. 1 and 2, are omitted from the illustration in Figs. 8 and 9. The operation of this first modified form is the same as previously described for the first embodiment.

Another modification of the invention is illustrated in Figs. 14 to 20, both inclusive, wherein several parts are omitted from each of the preceding embodiments. The parts bearing the same reference characters as employed in the previous forms will be understood as employed for similar purposes as hereinbefore described and discussed. The upper portion of the device shown in outside view in Figs. 14 and 15 contains the same parts as are shown in the corresponding upper portion of the device shown in Figs. 2 and 9, respectively.

In Figs. 14, 15, and 17 it will be observed that the sheaves 30B and 37 are cocked or turned at different angles, each, however, having its center coinciding with the same perpendicular center line. These sheaves are so turned in order to provide that the line, after it passes around either of the central sheaves, will clear the side of the other. The arms 22B are jogged out of alignment in three places, at 22B′, 22B′′, and 22B′′′, in order that they may have their inner surfaces parallel with sheaves 26, 30B, 37, and 42, respectively, as appears in Figs. 14 and 15. This jogging of the arms 22B also provides that the bases of the oil pump and counter may be secured upon the surfaces of these arms parallel with the respective sheaves which drive the pump and counter. This arrangement permits the geared sheaves 30B and 37 to be of larger diameter than would be possible in the preferred form, using the same diameter shell.

It will be observed that the construction and mechanical movements of each embodiment are so similar as to afford little choice from the standpoint of practicability, except that the second modified form has fewer parts and can be more cheaply manufactured than either of the other two embodiments.

The arms 22B and the plates 22a and 22b, upon which the oil pump and counter are mounted in this construction, preferably, should be a one piece casting. The hereinafter described and discussed parts are somewhat different from those of either of the forms preceding. The geared sheave 30B differs from the sheave 30 in Figs. 1 and 2 in that the gear teeth are integral with the sheave 30B, and differs from the sheave 30A in Figs. 8 and 9 in that the sheave 30B has a peripheral groove adapted to receive only one thickness of the line. The gland 24b is adapted to compress packing 24a by means of the threaded landing rod 21A through which rod the cable 6 is slidable. The plug 14A replaces plug 14 in the preceding embodiments. A portion of the upper side of upper plate 22a is turned off at 22a′ to allow the lubricant in chamber 5b to freely pass into shell 1 via openings 2a.

The outside diameter of the geared sheaves 30B and 37 are both so nearly the inside diameter of the shell that there is little danger of the line becoming disengaged from these sheaves. The shields 33B, secured to the arms 22B by screws 33a, however, are provided to avoid the possibility of the line becoming disengaged from sheaves 30B and 37 (see Fig. 14). Portions of the device shown in outside view will be understood as containing similar parts to those shown at the same place in the previous embodiment.

It will be noted that the latch, U-cup, and stop clock are omitted from the modification just described, although they may be employed if desired. In omitting the latch, U-cup, and stop clock from this modification of the invention, it is contemplated that a sensitive weight indicator will be employed to ascertain when the weight is landed, as was discussed in connection with the preferred embodiment.

It is obvious that mechanical changes, substitutions, and adaptations may be made in the structures and that equivalent may be substituted for the parts shown; and I reserve the right to make such mechanical changes, substitutions, and adaptations within the scope of the invention as comprehended by the stated objects and appended claims.

I claim:

1. In a measuring assembly adapted to measure an elongated member, such as cables, rods and the like by movement longitudinally thereof the combination of an elongated shell adapted to contain a lubricant, said shell having openings in the ends thereof through which said member may pass, spaced means within the casing for guiding the member adjacent said openings, and means intermediate said last mentioned means for frictionally engaging the member and driven thereby for measuring the distance of travel of the assembly upon the member.

2. In a measuring assembly adapted to move longitudinally of a member to be measured, spaced guiding means to maintain alinement of portions of the member at opposite ends of the assembly, rotatable means intermediate said guiding means for frictionally engaging the member to be driven thereby, and means for registering the revolutions of said last mentioned means to measure the distance traversed by the assembly upon the member.

3. In a measuring assembly adapted to move longitudinally of a member to be measured, spaced guides for maintaining alinement of portions of the member at opposite ends of the assembly, a sheave intermediate said guides displacing the member sidewardly so that the sheave will be frictionally engaged by the member and will be driven thereby upon movement of the assembly, and means for counting the revolutions of said sheave.

4. In a measuring assembly adapted to move longitudinally of a member to be measured, means for registering the amount of movement of the assembly relative to the member, and means for controlling the rate of movement of the assembly upon the member, said last mentioned means comprising a hydraulic brake mechanism frictionally engaging the member and driven thereby upon relative movement of the member and the assembly.

5. A measuring device adapted to move longitudinally of a member to be measured including a shell adapted to surround the member and move longitudinally thereof, means for measuring the movement of the shell longitudinally of the member, a lubricant within said shell and surrounding said last mentioned means, and hydraulic braking means frictionally engaging the member and driven thereby to control the rate of movement of the device upon the member.

6. A device for measuring a wire line or cable in situ comprising a measuring assembly surrounding the cable and adapted to travel longitudinally thereof, means for measuring the distance of movement of the assembly upon the cable, and means for arresting movement of the assembly when a predetermined point upon the cable is reached.

7. A device for measuring cables or the like in situ comprising a shell surrounding the cable to be measured, a pair of spaced sheaves rotatably mounted within said shell and having the cable intermediate the ends of the shell passing successively thereover so that the sheaves are frictionally engaged by the cable, hydraulic braking means operatively connected to one of said sheaves for controlling the rate of movement of the device upon the cable, and a counter operatively connected to the other of said sheaves to register the movement of the device relative to the cable.

8. A device for measuring cables or the like in situ comprising a shell surrounding the cable to be measured, a pair of spaced sheaves rotatably mounted within said shell and having the cable intermediate the ends of the shell passing successively thereover so that the sheaves are frictionally engaged by the cable, hydraulic braking means operatively connected to one of said sheaves for controlling the rate of movement of the device upon the cable, and a counter operatively connected to the other of said sheaves to register the movement of the device relative to the cable, there being a lubricant within the shell to lubricate the sheaves and supply fluid to the hydraulic braking means.

ALEXANDER BOYNTON.